United States Patent
Lu et al.

(10) Patent No.: US 7,640,081 B2
(45) Date of Patent: Dec. 29, 2009

(54) ROLL STABILITY CONTROL USING FOUR-WHEEL DRIVE

(75) Inventors: Jianbo Lu, Livonia, MI (US); Michael Brewer, Royal Oak, MI (US); Keith Mattson, Livonia, MI (US); Joseph C. Meyers, Farmington Hills, MI (US); Todd Brown, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 677 days.

(21) Appl. No.: 10/711,750

(22) Filed: Oct. 1, 2004

(65) Prior Publication Data

US 2006/0074530 A1    Apr. 6, 2006

(51) Int. Cl.
  *G05D 1/00*    (2006.01)
(52) U.S. Cl. .............................................. 701/1; 701/72
(58) Field of Classification Search .................. 701/69, 701/72, 87–89, 45–47, 1; 180/197, 248, 180/233; 475/150; 340/429, 440, 425.5
  See application file for complete search history.

(56) References Cited

U.S. PATENT DOCUMENTS

| | | |
|---|---|---|
| 2,917,126 A | 12/1959 | Phillips |
| 3,604,273 A | 9/1971 | Kwok et al. |
| 3,608,925 A | 9/1971 | Murphy |
| 3,797,893 A | 3/1974 | Burckhardt |
| 3,899,028 A | 8/1975 | Morris et al. |
| 3,948,567 A | 4/1976 | Kasselmann et al. |
| 3,972,543 A | 8/1976 | Presley et al. |
| 4,023,864 A | 5/1977 | Lang et al. |
| RE30,550 E | 3/1981 | Reise |
| 4,480,714 A | 11/1984 | Yabuta et al. |
| 4,592,565 A | 6/1986 | Eagle |
| 4,597,462 A | 7/1986 | Sano et al. |
| 4,624,476 A | 11/1986 | Tanaka et al. |
| 4,650,212 A | 3/1987 | Yoshimura |
| 4,679,808 A | 7/1987 | Ito et al. |
| 4,690,553 A | 9/1987 | Fukamizu et al. |
| 4,705,130 A | 11/1987 | Fukunaga et al. |
| 4,761,022 A | 8/1988 | Ohashi |
| 4,765,649 A | 8/1988 | Ikemoto et al. |
| 4,767,588 A | 8/1988 | Ito |
| 4,778,773 A | 10/1988 | Sukegawa |

(Continued)

FOREIGN PATENT DOCUMENTS

DE    36 16 907    11/1987

(Continued)

OTHER PUBLICATIONS

U.S. Appl. No. 10/459,697, filed Jun. 11, 2003, Lu.

(Continued)

*Primary Examiner*—Yonel Beaulieu
(74) *Attorney, Agent, or Firm*—Fredrick Owens; Angela M. Brunetti

(57) ABSTRACT

A control system (18) and method for controlling an automotive vehicle (10) includes a number of sensors that are used to generate a potential rollover signal. In response to the potential rollover, active differentials (112, 114, 116) may be used alone or in addition to braking to prevent the vehicle from rolling over.

35 Claims, 6 Drawing Sheets

U.S. PATENT DOCUMENTS

| | | |
|---|---|---|
| 4,809,183 A | 2/1989 | Eckert |
| 4,827,416 A | 5/1989 | Kawagoe et al. |
| 4,846,496 A | 7/1989 | Tanaka et al. |
| 4,872,116 A | 10/1989 | Ito et al. |
| 4,888,696 A | 12/1989 | Akatsu et al. |
| 4,898,431 A | 2/1990 | Karnopp et al. |
| 4,930,082 A | 5/1990 | Harara et al. |
| 4,951,198 A | 8/1990 | Watanabe et al. |
| 4,960,292 A | 10/1990 | Sadler |
| 4,964,679 A | 10/1990 | Rath |
| 4,966,249 A | 10/1990 | Imaseki |
| 4,967,865 A | 11/1990 | Schindler |
| 4,976,330 A | 12/1990 | Matsumoto |
| 4,998,593 A | 3/1991 | Karnopp et al. |
| 5,033,770 A | 7/1991 | Kamimura et al. |
| 5,058,017 A | 10/1991 | Adachi et al. |
| 5,066,041 A | 11/1991 | Kindermann et al. |
| 5,088,040 A | 2/1992 | Matsuda et al. |
| 5,089,967 A | 2/1992 | Haseda et al. |
| 5,163,319 A | 11/1992 | Spies et al. |
| 5,200,896 A | 4/1993 | Sato et al. |
| 5,208,749 A | 5/1993 | Adachi et al. |
| 5,224,765 A | 7/1993 | Matsuda |
| 5,228,757 A | 7/1993 | Ito et al. |
| 5,239,868 A | 8/1993 | Takenaka et al. |
| 5,247,466 A | 9/1993 | Shimada et al. |
| 5,261,503 A | 11/1993 | Yasui |
| 5,265,020 A | 11/1993 | Nakayama |
| 5,274,576 A | 12/1993 | Williams |
| 5,278,761 A | 1/1994 | Ander et al. |
| 5,282,134 A | 1/1994 | Gioutsos et al. |
| 5,297,646 A | 3/1994 | Yamamura et al. |
| 5,307,274 A | 4/1994 | Takata et al. |
| 5,311,431 A | 5/1994 | Cao et al. |
| 5,311,956 A | 5/1994 | Sugiyama |
| 5,324,102 A | 6/1994 | Roll et al. |
| 5,335,176 A | 8/1994 | Nakamura |
| 5,365,439 A | 11/1994 | Momose et al. |
| 5,370,199 A | 12/1994 | Akuta et al. |
| 5,408,411 A | 4/1995 | Nakamura et al. |
| 5,446,658 A | 8/1995 | Pastor et al. |
| 5,455,770 A | 10/1995 | Hadeler et al. |
| 5,479,348 A * | 12/1995 | Sasaki .................. 701/88 |
| 5,510,989 A | 4/1996 | Zabler et al. |
| 5,515,277 A | 5/1996 | Mine |
| 5,548,536 A | 8/1996 | Ammon |
| 5,549,328 A | 8/1996 | Cubalchini |
| 5,560,688 A | 10/1996 | Schappler et al. |
| 5,579,245 A | 11/1996 | Kato |
| 5,598,335 A | 1/1997 | You |
| 5,602,734 A | 2/1997 | Kithil |
| 5,610,575 A | 3/1997 | Gioutsos |
| 5,627,756 A | 5/1997 | Fukada et al. |
| 5,634,698 A | 6/1997 | Cao et al. |
| 5,640,324 A | 6/1997 | Inagaki |
| 5,648,903 A | 7/1997 | Liubakka |
| 5,671,982 A | 9/1997 | Wanke |
| 5,676,433 A | 10/1997 | Inagaki et al. |
| 5,694,319 A | 12/1997 | Suissa et al. |
| 5,703,776 A | 12/1997 | Soung |
| 5,707,117 A | 1/1998 | Hu et al. |
| 5,707,120 A | 1/1998 | Monzaki et al. |
| 5,720,533 A | 2/1998 | Pastor et al. |
| 5,723,782 A | 3/1998 | Bolles, Jr. |
| 5,732,377 A | 3/1998 | Eckert |
| 5,732,378 A | 3/1998 | Eckert et al. |
| 5,732,379 A | 3/1998 | Eckert et al. |
| 5,736,939 A | 4/1998 | Corcoran |
| 5,737,224 A | 4/1998 | Jeenicke et al. |
| 5,740,041 A | 4/1998 | Iyoda |
| 5,740,877 A | 4/1998 | Sasaki |
| 5,742,918 A | 4/1998 | Ashrafi et al. |
| 5,742,919 A | 4/1998 | Ashrafi et al. |
| 5,762,406 A | 6/1998 | Yasui et al. |
| 5,782,543 A | 7/1998 | Monzaki et al. |
| 5,787,375 A | 7/1998 | Madau et al. |
| 5,801,647 A | 9/1998 | Survo et al. |
| 5,809,434 A | 9/1998 | Ashrafi et al. |
| 5,816,670 A | 10/1998 | Yamada et al. |
| 5,825,284 A | 10/1998 | Dunwoody et al. |
| 5,842,143 A | 11/1998 | Lohrenz et al. |
| 5,857,160 A | 1/1999 | Dickinson et al. |
| 5,857,535 A | 1/1999 | Brooks |
| 5,869,943 A | 2/1999 | Nakashima et al. |
| 5,878,357 A | 3/1999 | Sivashankar et al. |
| 5,890,084 A | 3/1999 | Halasz et al. |
| 5,893,896 A | 4/1999 | Imamura et al. |
| 5,925,083 A | 7/1999 | Ackermann |
| 5,931,546 A | 8/1999 | Nakashima et al. |
| 5,944,137 A | 8/1999 | Moser et al. |
| 5,944,392 A | 8/1999 | Tachihata et al. |
| 5,946,644 A | 8/1999 | Cowan et al. |
| 5,964,819 A | 10/1999 | Naito |
| 5,971,503 A | 10/1999 | Joyce et al. |
| 6,002,974 A | 12/1999 | Schiffmann |
| 6,002,975 A | 12/1999 | Schiffmann et al. |
| 6,026,926 A | 2/2000 | Noro et al. |
| 6,038,495 A | 3/2000 | Schiffmann |
| 6,040,916 A | 3/2000 | Griesinger |
| 6,050,360 A | 4/2000 | Pattok et al. |
| 6,055,472 A | 4/2000 | Breunig et al. |
| 6,062,336 A | 5/2000 | Amberkar et al. |
| 6,065,558 A | 5/2000 | Wielenga |
| 6,073,065 A | 6/2000 | Brown et al. |
| 6,079,513 A | 6/2000 | Nishizaki et al. |
| 6,081,761 A | 6/2000 | Harada et al. |
| 6,085,860 A | 7/2000 | Hackl et al. |
| 6,086,168 A | 7/2000 | Rump |
| 6,089,344 A | 7/2000 | Baughn et al. |
| 6,104,284 A | 8/2000 | Otsuka |
| 6,121,873 A | 9/2000 | Yamada et al. |
| 6,122,568 A | 9/2000 | Madau et al. |
| 6,122,584 A | 9/2000 | Lin et al. |
| 6,129,172 A | 10/2000 | Yoshida |
| 6,141,604 A | 10/2000 | Mattes et al. |
| 6,141,605 A | 10/2000 | Joyce |
| 6,144,904 A | 11/2000 | Tseng |
| 6,149,251 A | 11/2000 | Wuerth et al. |
| 6,161,905 A | 12/2000 | Hac et al. |
| 6,169,939 B1 | 1/2001 | Raad et al. |
| 6,169,946 B1 | 1/2001 | Griessbach |
| 6,176,555 B1 | 1/2001 | Semsey |
| 6,178,375 B1 | 1/2001 | Breunig |
| 6,179,310 B1 | 1/2001 | Clare et al. |
| 6,179,394 B1 | 1/2001 | Browalski et al. |
| 6,184,637 B1 | 2/2001 | Yamawaki et al. |
| 6,185,485 B1 | 2/2001 | Ashrafti et al. |
| 6,185,497 B1 | 2/2001 | Taniguchi et al. |
| 6,186,267 B1 | 2/2001 | Hackl et al. |
| 6,192,305 B1 | 2/2001 | Schiffmann |
| 6,195,606 B1 | 2/2001 | Barta et al. |
| 6,198,988 B1 | 3/2001 | Tseng |
| 6,202,009 B1 | 3/2001 | Tseng |
| 6,202,020 B1 | 3/2001 | Kyrtsos |
| 6,206,383 B1 | 3/2001 | Burdock |
| 6,219,604 B1 | 4/2001 | Dilger et al. |
| 6,223,114 B1 | 4/2001 | Boros et al. |
| 6,226,579 B1 | 5/2001 | Hackl et al. |
| 6,227,482 B1 | 5/2001 | Yamamoto |
| 6,233,510 B1 | 5/2001 | Platner et al. |
| 6,236,916 B1 | 5/2001 | Staub et al. |
| 6,263,261 B1 | 7/2001 | Brown et al. |
| 6,266,596 B1 | 7/2001 | Hartman et al. |
| 6,272,420 B1 | 8/2001 | Schramm et al. |

| | | |
|---|---|---|
| 6,278,930 B1 | 8/2001 | Yamada et al. |
| 6,282,471 B1 | 8/2001 | Burdock et al. |
| 6,282,472 B1 | 8/2001 | Jones et al. |
| 6,282,474 B1 | 8/2001 | Chou et al. |
| 6,290,019 B1 | 9/2001 | Kolassa et al. |
| 6,292,734 B1 | 9/2001 | Murakami et al. |
| 6,292,759 B1 | 9/2001 | Schiffmann |
| 6,311,111 B1 | 10/2001 | Leimbach et al. |
| 6,314,329 B1 | 11/2001 | Madau et al. |
| 6,315,373 B1 | 11/2001 | Yamada et al. |
| 6,321,141 B1 | 11/2001 | Leimbach |
| 6,324,445 B2 | 11/2001 | Tozu et al. |
| 6,324,446 B1 | 11/2001 | Brown et al. |
| 6,324,458 B1 | 11/2001 | Takagi et al. |
| 6,330,522 B1 | 12/2001 | Takeuchi |
| 6,332,104 B1 | 12/2001 | Brown et al. |
| 6,338,012 B2 | 1/2002 | Brown et al. |
| 6,349,247 B1 | 2/2002 | Schramm et al. |
| 6,351,694 B1 | 2/2002 | Tseng et al. |
| 6,352,318 B1 | 3/2002 | Hosomi et al. |
| 6,356,188 B1 | 3/2002 | Meyers et al. |
| 6,363,309 B1 | 3/2002 | Irie et al. |
| 6,370,938 B1 | 4/2002 | Leimbach et al. |
| 6,394,240 B1 | 5/2002 | Barwick |
| 6,397,127 B1 | 5/2002 | Meyers et al. |
| 6,419,240 B1 | 7/2002 | Burdock et al. |
| 6,424,897 B1 | 7/2002 | Mattes et al. |
| 6,428,118 B1 | 8/2002 | Blosch |
| 6,438,464 B1 * | 8/2002 | Woywod et al. ............... 701/1 |
| 6,459,990 B1 | 10/2002 | McCall et al. |
| 6,471,218 B1 | 10/2002 | Burdock et al. |
| 6,477,480 B1 | 11/2002 | Tseng et al. |
| 6,496,758 B2 | 12/2002 | Rhode et al. |
| 6,496,763 B2 | 12/2002 | Griessbach |
| 6,498,976 B1 | 12/2002 | Ehlbeck et al. |
| 6,502,023 B1 | 12/2002 | Fukada |
| 6,507,016 B1 * | 1/2003 | Cooper .................... 250/231.1 |
| 6,526,342 B1 | 2/2003 | Burdock et al. |
| 6,529,803 B2 | 3/2003 | Meyers et al. |
| 6,542,792 B2 | 4/2003 | Schubert et al. |
| 6,547,022 B2 | 4/2003 | Hosomi et al. |
| 6,553,284 B2 | 4/2003 | Holst et al. |
| 6,554,293 B1 | 4/2003 | Fennel et al. |
| 6,556,908 B1 | 4/2003 | Lu et al. |
| 6,559,634 B2 | 5/2003 | Yamada |
| 6,593,849 B2 | 7/2003 | Chubb |
| 6,598,946 B2 | 7/2003 | Nagae |
| 6,600,414 B2 | 7/2003 | Foo et al. |
| 6,600,985 B2 | 7/2003 | Weaver |
| 6,618,656 B2 | 9/2003 | Kueblbeck et al. |
| 6,631,317 B2 | 10/2003 | Lu |
| 6,644,454 B2 | 11/2003 | Yamada et al. |
| 6,650,971 B2 | 11/2003 | Haas |
| 6,654,674 B2 | 11/2003 | Lu et al. |
| 6,657,539 B2 | 12/2003 | Yamamoto et al. |
| 6,681,196 B2 | 1/2004 | Glaser et al. |
| 6,694,225 B2 * | 2/2004 | Aga et al. ................ 701/1 |
| 6,704,631 B2 | 3/2004 | Winner et al. |
| 6,747,553 B2 | 6/2004 | Yamada et al. |
| 6,756,890 B1 | 6/2004 | Leimbach et al. |
| 6,799,092 B2 | 9/2004 | Lu |
| 2003/0182025 A1 | 9/2003 | Tseng et al. |
| 2004/0064246 A1 | 4/2004 | Lu |
| 2004/0199320 A1 | 10/2004 | Harada |

FOREIGN PATENT DOCUMENTS

| | | |
|---|---|---|
| DE | 38 15 938 | 11/1989 |
| DE | 43 21 571 | 1/1994 |
| DE | 42 27 886 | 2/1994 |
| DE | 42 28 893 | 3/1994 |
| DE | 43 35 979 | 4/1995 |
| DE | 43 42 732 | 6/1995 |
| DE | 199 07 633 | 10/1999 |
| DE | 10025493 | 5/2000 |
| DE | 10065010 | 12/2000 |
| DE | 10046036 | 3/2002 |
| DE | 10133409 | 1/2003 |
| EP | 0 430 813 | 12/1993 |
| EP | 0 662 601 | 7/1995 |
| EP | 0 758 601 | 2/1997 |
| EP | 1 046 571 | 4/2000 |
| EP | 1 197 409 | 9/2001 |
| FR | 24 25 342 | 12/1979 |
| GB | 2257403 | 1/1993 |
| GB | 2 342 078 | 4/2000 |
| JP | 62055211 | 9/1985 |
| JP | 63116918 | 5/1988 |
| JP | 63151539 | 6/1988 |
| JP | 63203456 | 8/1988 |
| JP | 1101238 | 4/1989 |
| JP | 2171373 | 7/1990 |
| JP | 3042360 | 2/1991 |
| JP | 3042452 | 2/1991 |
| JP | 4008837 | 1/1992 |
| JP | 5016699 | 1/1993 |
| JP | 5254406 | 10/1993 |
| JP | 6278586 | 10/1994 |
| JP | 6297985 | 10/1994 |
| JP | 6312612 | 11/1994 |
| JP | 8080825 | 3/1996 |
| JP | 9030284 | 4/1997 |
| JP | 9005352 | 10/1997 |
| JP | 10024819 | 1/1998 |
| JP | 10329682 | 12/1998 |
| JP | 11011272 | 1/1999 |
| JP | 11170992 | 6/1999 |
| JP | 11254992 | 9/1999 |
| JP | 11255093 | 9/1999 |
| JP | 11304663 | 10/1999 |
| JP | 11304662 | 11/1999 |
| JP | 11321603 | 11/1999 |
| SU | 816849 | 3/1981 |
| WO | WO 02/20318 | 3/2002 |
| WO | WO 03/072397 | 9/2003 |

OTHER PUBLICATIONS

U.S. Appl. No. 10/608,909, filed Jun. 27, 2003, Lu.

A method for reducing on-road rollovers—anti-rollover braking, Thomas J. Wielenga, Dynamotive, LLC, International Congress and Exposition, Detroit, Michigan, Mar. 1-4, 1999.

Eger, R., Majjad, R., Naser, N., "Rollover simulation based on a nonlinear model", SAE 98020.

Nalecz, A.G., Bindemann, A.C., Brewer H.K., "Dynamic analysis of vehicle rollover", 12th International Conference on Experimental Safety Vehicles, Goteborg, Sweden, May 29-Jun. 1, 1989.

Niii, N., Nishijima, Y., Nakagaw, K., "rollover analysis method of a large-size bus", JSAE 9540020, 1995.

Eger, R., Kiencke, U., "Modeling of rollover sequences", Control Engineering Practice 11 (2003) 209-216.

Chen, Bo-Chiuan, Peng, Huei; "A Real-time Rollover Threat Index for Sports Utility Vehicles", Proceedings of the American Control Conference, San Diego, CA, Jun. 1999.

* cited by examiner

ROLL STABILITY CONTROL USING FOUR-WHEEL DRIVE

TECHNICAL FIELD

The present invention relates generally to a roll stability control system in a vehicle and, more specifically to a roll stability control system for an all-wheel drive vehicle or a four-wheel drive (partial time all wheel drive) vehicle.

BACKGROUND

Traditionally, vehicles have a 4×2 system where only two wheels at one axle (either the front or the rear) can provide driving torques. Recently, many SUVs have a 4×4 system which can distribute power to all four wheels instead of two wheels. The benefit of the 4×4 system is easy to understand. Such a system has the potential to double the amount of longitudinal force over a conventional 4×2 system if the traction potentials of the tires exceed the driving torques applied. There are three types of 4×4 systems, namely, the part-time 4×4 system, the all wheel drive system (AWD) and the torque-on-demand (TOD) System.

In the part-time 4×4 system, the driver is allowed to select a four-wheel drive (4WD) mode, in which the front and rear driveshafts are locked together, or a two wheel drive (2WD) mode, in which the driveshafts are unlocked. In many situations, even the part-time 4×4 system provides an advantage over the 4×2 system in that the vehicle has traction if either axle has traction. For example, 4×2 (also called two-wheel-drive) vehicles may not move if there is a thick layer of snow on the road. A 4×4 vehicle can utilize the traction of all four tires to move the vehicle. During off-road driving, the vehicle may constantly meet conditions where at least one set of tires (for example the front tires) is in a low-traction situation. With 4×4 systems, the other set of driven tires can pull the vehicle out. During mountain driving, a large amount of traction may be required. A 4×4 vehicle may utilize the traction of all the four tires to overcome the gravity to move the vehicle up the hill. However, when in 4WD mode, the driveshafts are forced to rotate at the same speed. This could cause turning difficulty if the vehicle is turned at low speed on a high mu surface. In order to overcome this, all wheel drive (AWD) systems have been introduced.

An AWD vehicle has two types of differentials. The first is the axle differential. There are two axle differentials: one located between the two front wheels and one between the two rear wheels. The second is the so-called center differential, which is located inside a transfer case. The front and rear differentials enable the speed difference between the inside and outside wheels during a turn and they transfer torques from the driveshafts to the drive wheels. The center differential in the transfer case handles the speed difference between the front and rear wheels during a turn. It usually provides a constant torque split between the front and the rear axles. During normal driving and when no wheels are slipping, the center differential might direct a high amount of torque to both axles with a fixed proportion, such as 35% to the front and 65% to the rear. On low mu road surfaces, the transfer case on a part-time 4×4 system locks the front-axle driveshaft to the rear-axle driveshaft so the wheels are forced to spin at the same speed regardless if one or more wheels do not have enough traction potential. On high mu surfaces, this lock would introduce large tire slips during a turn, which could cause a jerky turn and extra tire wear. Hence, it is desired to unlock the center differential on a high mu surface and transfer torques to front and rear drive shafts in a continuously controllable fashion. This is an objective of the AWD system.

A TOD system always provides the driving torque to one axle (primary axle), and then sends torque to the other (secondary axle) as needed to provide 4WD mode while yet avoiding unnecessary differential lock in turns. In normal driving, most torque goes to the primary axle, with little torque going to the secondary axle. When in slippery conditions, if the primary axle slips, the transfer case will direct torque to the secondary axle.

In the above three types of 4×4 systems, to achieve a significant fuel economy benefit in a 2WD mode, a 4×4 system must not only disconnect the front driveline at the transfer case, but also disconnect it at the axle. This permits the front driveline to remain stationary, reducing parasitic and inertial losses. At this time no vehicles disconnect their rear-driveline, but this is an entirely practical means of improving the fuel economy of a 4×4 vehicle based on a front-wheel drive architecture. Several types of front driveline disconnect systems exist. Hublock is a system that disengages the front axle at both wheel hubs. Disconnect systems may be manual, automatic, or activated by means such as vacuum. Vacuum systems are generally considered most efficient because they disconnect the full front driveline. Center axle disconnect is a system that employs a single disconnect on one side of the axle. A free-running differential system is a system that employs a single disconnect between the differential and the ring gear of the axle. A live axle is an axle without a disconnect. If the transfer case has a disconnect or is not sending torque, the axle will effectively be backdriven from the road.

There are many choices for both axle and center differentials. Popular axle differentials used in a 4×4 vehicle might be an open differential, a passive limited-slip differential such as a Torsen differential, a viscous coupling or an electronically controlled differential. The transfer case used for an AWD vehicle might be a passive limited-slip differential or an electronically controlled viscous coupling such as a Haldex. It is desirable to consider the interaction between a brake-based roll stability control and the controlled differentials so that the interaction improves the roll stability control performance. In such a case, the system synergy by integrating those two systems enhances the individual performance compared to when the systems are separately operated.

A rule of thumb for conducting roll stability control is to reduce the excessive lateral forces at the outside wheels of the vehicle when it is driven and turned aggressively. When a vehicle is turning in response to the driver's sharp steering input, large tire forces may be induced in the lateral directions of the tires. Since the weight shifts towards the outside wheels, the outside wheels experience more lateral forces than the inside wheels. Typically, braking forces are applied to the outside front wheel to reduce the lateral force at the front outside wheel, which is the main contributor of the total lateral force applied to the vehicle body. Typically, the corrective forces in the longitudinal direction through driving torque for the purpose of reducing tire lateral forces from a 4×4 system are not directly used for achieving roll stability control performance.

It would be desirable to provide a system that uses the controlled driving torques through controlling the axle and center differentials in a 4×4 system to help reduce the potential for an on-road rollover of a vehicle, or further to provide a system that integrates the controlled driving torque from a 4×4 system control with the controlled braking torque from brake controls to achieve roll stability control performance during a potential on-road rollover event.

SUMMARY OF THE INVENTION

In the present invention, the drive torques may be increased in both front and rear axles using the 4×4 system. Thus, due to the friction circles at the tires, the tire lateral forces in the front and the rear wheels, especially in outside wheels, can be altered accordingly. One advantage of the present invention is that roll stability control performances can be achieved not only by the front outside wheel but also by the rear outside wheel. While in brake-based roll stability control, braking the front outside wheel is the main control mechanism. The weight transfer due to acceleration through driving torque management in a 4×4 system may be more favorable for roll stability control purposes than the weight transfer due to deceleration during braking from a brake control system. The acceleration causes the vehicle weight transfer from the front to the rear, while the deceleration causes the vehicle weight transfer from the rear to the front. Hence, the rear wheel might have a higher level of tire forces in four-wheel drive mode. That is, the rear lateral tire forces are more useful for roll stability control than those generated in the rear axle during a braking event. At the same time, the front tires have a lower level of tire forces than in the braking case. Hence, both front and rear tires are effective in terms of removing lateral forces through increasing longitudinal tire forces. The reduced tire lateral forces lead to reduced vehicle lateral acceleration applied to the center of gravity of the vehicle body. Therefore, the overturning roll moment of the vehicle generated from the force couple of tire lateral forces and the vehicle centripetal force applied to the center of gravity of the vehicle body will be reduced.

Although the vehicle rollover trend might be reduced by applying throttle in the engine controls so as to increase driving torque of the driven wheels, the longitudinal force offsets between the outside wheels and inside wheels (due to vehicle weight transferred from inside wheels to outside wheels) may generate a moment which tends to over-steer the vehicle. The larger the vehicle chassis or suspension roll angle, the larger the longitudinal force offset between the inside and outside wheels. Therefore, a simple driving torque control could reduce the roll trending, but at the expense of inducing some vehicle over-steer. Since an increased over-steer could eventually reduce the benefit of tire lateral force reduction, and over-steer during an increased vehicle speed might cause yaw stability problems, a simple driving torque scheme alone might be inappropriate for achieving vehicle roll and yaw stability control performances. In order to eliminate such an adverse effect, an integration between the driving torque control and the brake torque control through controlling the corresponding ECUs is pursued. For this reason, a desirable roll stability control using a 4×4 system might include control units of a brake control system, an engine control system, and a 4×4 system control.

In one aspect of the invention, a method of controlling a vehicle equipped with a 4×4 system comprises determining a potential rollover condition and transferring driving torque to the front wheels and coordinating the driving torque at one wheel location with braking torque at another location to prevent a potential on-road rollover from happening, or if there are both driving and braking torque requested at the same wheel location, resolving the conflict through prioritizing and arbitrating.

In a further aspect of the invention, a method of controlling a vehicle equipped with a 4×4 system comprises generating a rollover signal in response to the potential rollover, increasing the torque in the front wheel through the active differential or in a slip-limit differential case through the combination of increasing torque and increasing braking torque in response to the rollover signal, and braking a rear outside wheel in response to the rollover signal.

In yet another aspect of the invention, a method of controlling a vehicle having an active center differential included in a transfer case and active axle differentials comprises determining a rollover condition; in response to the rollover condition, disengaging an inside wheel from an outside wheel with an active axle differential; and thereafter, determining a wheel lift condition of the inside wheel.

In yet another aspect of the invention, a method for controlling the vehicle rollover having an active center differential and active axle differentials comprises determining a rollover condition; in response to the rollover condition, disengaging an outside front wheel from an inside wheel with the active axle differential; applying a brake torque to the outside front wheel; and applying driving torque to an outside rear wheel to counter the deceleration caused by braking the front outside wheel.

In yet another aspect of the invention, a method for controlling the vehicle rollover having an active center differential and active axle differentials comprises determining a rollover condition; in response to the rollover condition, disengaging an outside front wheel from an inside wheel with the active axle differential; applying a driving torque to the outside front wheel; and applying brake torque to an outside rear wheel to counter the acceleration caused by driving the front outside wheel.

Advantageously, the cost of implementing a dynamic control system may be reduced. Another advantage is that the brake control-based roll stability control function can be improved through using the driving torque information and actuation of the 4×4 system control. A further advantage is that the information used in the brake control-based roll stability control system can be used to improve the function of the 4×4 system controls. A further advantage is that the system synergy between the controlled 4×4 system and the brake control system can be achieved such that more functions other than roll stability controls and 4×4 system controls may be achieved.

DETAILED DESCRIPTION

Figure 1:
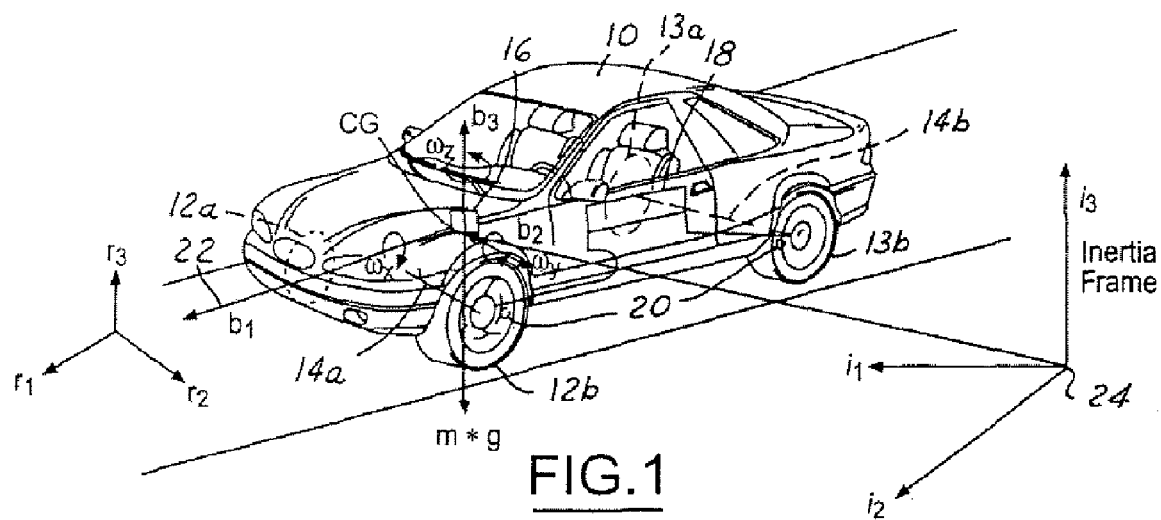
FIG. 1 is a diagrammatic view of a vehicle with variable vectors and coordinate frames according to the present invention.

In the following figures, the same reference numerals will be used to identify the same components. The present invention is preferably used in conjunction with a roll stability control system or a rollover stability control or a rollover control system for a vehicle. However, the present invention may also be used with a deployment device such as an airbag or an active roll bar. The present invention will be discussed below in terms of preferred embodiments relating to an automotive vehicle moving in a three-dimensional road terrain. Also, the system may be used with a four-wheel drive or all-wheel drive vehicle. Such a vehicle is generally referred to as a four driven wheel vehicle since each of the wheels is capable of generating longitudinal forces derived from the powertrain.

Referring to FIG. 1, an automotive vehicle 10 with an active safety system of the present invention is illustrated with the various forces and moments thereon during a potential rollover condition. Vehicle 10 has front right (FR) and front left (FL) wheel/tires 12a and 12b and rear right (RR) wheel/tires 13a and rear left (RL) wheel/tires 13b, respectively. The vehicle 10 may also have a number of different types of front steering systems 14a and rear steering systems 14b, including having each of the front and rear wheels configured with a respective controllable actuator, the front and rear wheels having a conventional type system in which both of the front wheels are controlled together and both of the rear wheels are controlled together, a system having conventional front steering and independently controllable rear steering for each of the wheels, or vice versa. Generally, the vehicle has a weight represented as Mg at the center of gravity of the vehicle, where g=9.8 m/s$^2$ and M is the total mass of the vehicle.

As mentioned above, the system may also be used with active control systems including active/semi-active suspension systems, anti-roll bar, active steering systems or deployable airbags or other active safety devices deployed or activated upon sensing predetermined dynamic conditions of the vehicle.

The sensing system 16 is coupled to a control system 18. The sensing system 16 may comprise many different sensors including the sensor set typically found in a roll stability control or a rollover control system (including lateral accelerometer, yaw rate sensor, steering angle sensor and wheel speed sensor which are equipped for a traditional yaw stability control system) together with a roll rate sensor and a longitudinal accelerometer. The various sensors will be further described below. The sensors may also be used by the control system in various determinations such as to determine a wheel lifting event, determine a height, position and amount of an added mass, the road surface friction level, the road profiles, the abnormal operation states of the vehicle and its tires, various motion variables and states of the vehicle, etc. The wheel speed sensors 20 are mounted at each corner of the vehicle and generate signals corresponding to the rotational speed of each wheel. The rest of the sensors of sensing system 16 may be mounted directly on the center of gravity of the vehicle body, along the directions x, y and z shown in FIG. 1. As those skilled in the art will recognize, the frame from $b_1$, $b_2$ and $b_3$ is called a body frame 22, whose origin is located at the center of gravity of the vehicle body, with the $b_1$ along the longitudinal direction of the vehicle body (pointing forward), $b_2$ along the lateral direction of the vehicle body (pointing off the driving side, i.e., to the left), and the $b_3$ along the vertical direction of the vehicle body (pointing upward). The angular rates of the vehicle body are denoted about the vehicle body's respective axes as $\omega_x$ for the roll rate, $\omega_y$ for the pitch rate and $\omega_z$ for the yaw rate. Calculations may take place in an inertial frame 24 that may be derived from the body frame 22 as described below.

The longitudinal acceleration sensor is mounted on the vehicle body located at the center of gravity, with its sensing direction along $b_1$-axis, whose output is denoted as $a_x$. The lateral acceleration sensor is mounted on the vehicle body located at the center of gravity, with its sensing direction along $b_2$-axis, whose output is denoted as $a_y$.

The other frame used in the following discussion includes the road frame, as depicted in FIG. 1. The road frame system $r_1 r_2 r_3$ is attached to the average driven road surface which is translating and yawing with the vehicle and determined by averaging the four-tire/road contact patches, where the $r_3$ axis is along the average road normal direction computed from the normal directions of the four-tire/road contact patches.

In the following discussion, the Euler angles of the body frame $b_1 b_2 b_3$ with respect to the road frame $r_1 r_2 r_3$ are denoted as $\theta_{xbr}$ and $\theta_{ybr}$, which are also called the relative Euler angles (i.e., relative roll and relative pitch angles, respectively).

Figure 2:
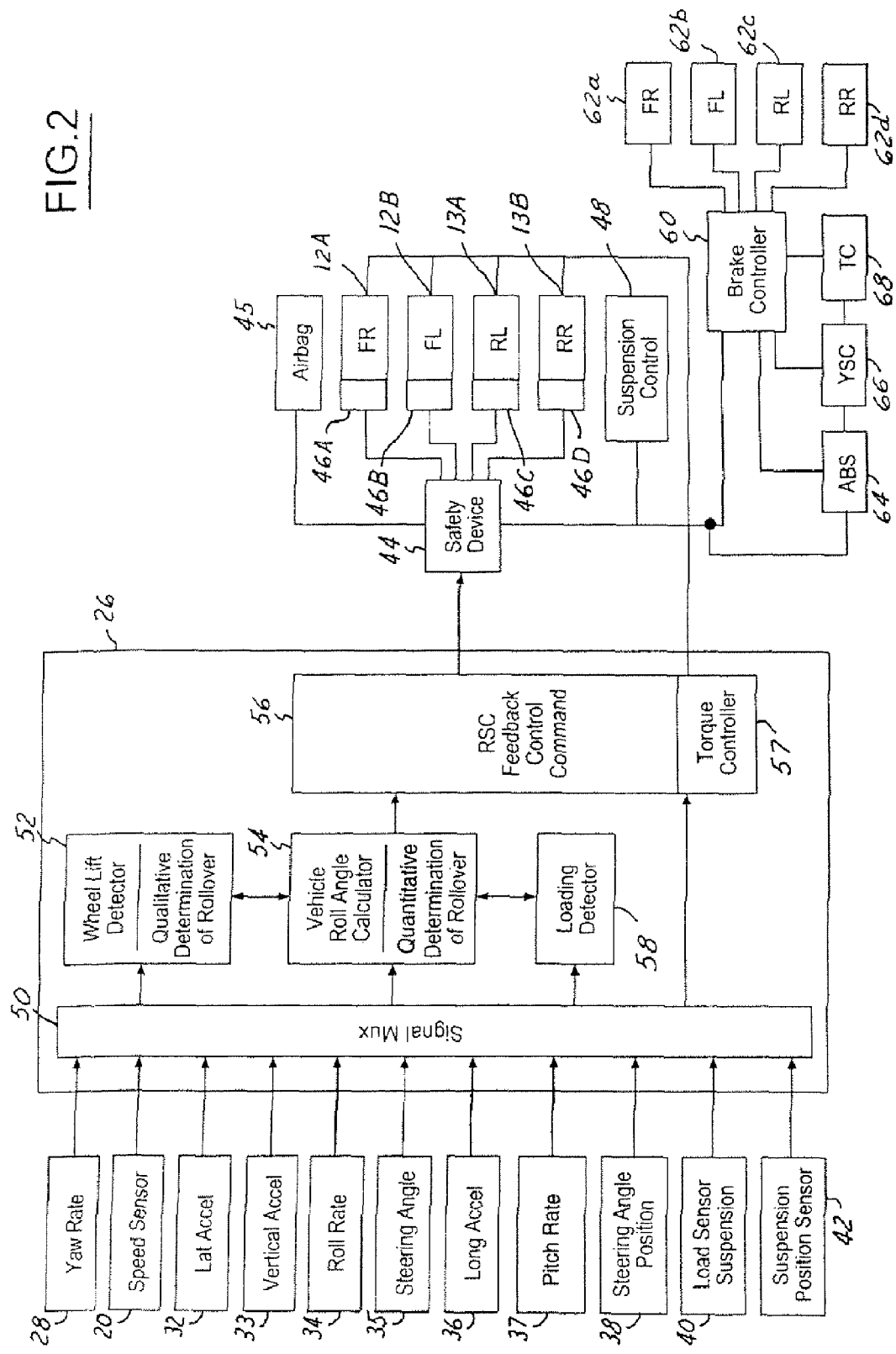
FIG. 2 is a block diagram of an active safety system according to the present invention.

Referring now to FIG. 2, roll stability control system 18 is illustrated in further detail having a controller 26 used for receiving information from a number of sensors which may include a yaw rate sensor 28, a speed sensor 20, a lateral acceleration sensor 32, a vertical accelerometer sensor 33, a roll angular rate sensor 34, a steering wheel (hand wheel) angle sensor 35, a longitudinal acceleration sensor 36, a pitch rate sensor 37, steering angle (of the wheels or actuator) position sensor 38, suspension load sensor 40 and suspension position sensor 42. It should be noted that various combinations and sub-combinations of the sensors may be used.

Controller 26 may include a signal multiplexer 50 that is used to receive the signals from the sensors 28-42. The signal multiplexer 50 provides the signals to a wheel lift detector 52, a vehicle roll angle calculator 54, and to a roll stability control (RSC) feedback control command 56. Also, wheel lift detector 52 may be coupled to the vehicle roll angle calculator 54. The vehicle roll angle calculator 54 may also be coupled to the RSC feedback command 56. The RSC feedback command 56 may include a torque controller 57. A vehicle roll angle calculator 54 is described in U.S. Provisional Application 60/400,376 and 60/400,172, and in U.S. patent application Ser. No. 10/459,697, the disclosures of which are incorporated herein by reference.

A loading detector 58 may also be included in controller 26. The loading detector 58 may be used to determine an additional mass of the vehicle and a distance of the mass as will be described below.

In the preferred embodiment, the sensors are located at the center of gravity of the vehicle. Those skilled in the art will recognize that the sensors may also be located off the center of gravity and translated equivalently thereto.

Lateral acceleration, roll orientation and speed may be obtained using a global positioning system (GPS). Based upon inputs from the sensors, controller 26 may control a safety device 44. Depending on the desired sensitivity of the system and various other factors, not all the sensors 28-42 may be used in a commercial embodiment. Safety device 44 may control an airbag 45 or a steering actuator 46A-46D at one or more of the wheels 12a, 12b, 13a, 13b of the vehicle. Also, other vehicle components such as a suspension control 48 may be used to adjust the suspension during a potential rollover event to help reduce initial roll trending of the vehicle, to reduce the over-steer characteristics of the vehicle and to work together with roll stability control so as to achieve a smooth and non-intrusive rollover prevention.

Roll angular rate sensor 34 and pitch rate sensor 37 may sense the roll condition or lifting of the vehicle based on sensing the height of one or more points on the vehicle relative to the road surface. Sensors that may be used to achieve this include but are not limited to a radar-based proximity sensor, a laser-based proximity sensor and a sonar-based proximity sensor. The roll rate sensor 34 may also use a combination of sensors such as proximity sensors to make a roll rate determination.

Roll rate sensor 34 and pitch rate sensor 37 may also sense the roll condition or wheel lifting condition based on sensing the linear or rotational relative displacement or displacement velocity of one or more of the suspension chassis components. This may be in addition to or in combination with suspension position sensor 42. The position sensor 42, roll rate sensor 34 and/or the pitch rate sensor 37 may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick.

The roll condition or wheel lifting condition may also be sensed by sensing directly or estimating the force or torque associated with the loading condition of one or more suspension or chassis components including a pressure transducer in an act of air suspension, a shock absorber sensor such as a load sensor 40, a strain gauge, the steering system absolute or relative motor load, the steering system pressure of the hydraulic lines, a tire lateral force sensor or sensors, a longitudinal tire force sensor, a vertical tire force sensor or a tire sidewall torsion sensor. The yaw rate sensor 28, the roll rate sensor 34, the lateral acceleration sensor 32, and the longitudinal acceleration sensor 36 may be used together to determine that the wheel has lifted. Such sensors may be used to determine wheel lift or estimate normal loading associated with wheel lift.

The roll condition of the vehicle may also be established by one or more of the following translational or rotational positions, velocities or accelerations of the vehicle including a roll gyro, the roll rate sensor 34, the yaw rate sensor 28, the lateral acceleration sensor 32, the vertical acceleration sensor 33, a vehicle longitudinal acceleration sensor 36, lateral or vertical speed sensor including a wheel-based speed sensor 20, a radar-based speed sensor, a sonar-based speed sensor, a laser-based speed sensor or an optical-based speed sensor.

Safety device 44 may control the position of the front right wheel actuator 46A, the front left wheel actuator 46B, the rear left wheel actuator 46C, and the right rear wheel actuator 46D. Although as described above, two or more of the actuators may be simultaneously controlled. For example, in a rack-and-pinion system, the two wheels coupled thereto are simultaneously controlled. Based on the inputs from sensors 28 through 42, controller 26 determines a roll condition and/or wheel lift and controls the steering position and/or braking of the wheels.

Safety device 44 may be coupled to a brake controller 60. Brake controller 60 controls the amount of brake torque at a front right brake 62A, front left brake 62*b*, rear left brake 62*c* and a rear right brake 62*d*. Other safety systems such as an antilock brake system 64, a yaw stability control system 66 and a traction control system 68 may also benefit from the knowledge of the roll gradient, roll rate parameter, roll acceleration coefficient, additional mass and position of the mass. This information may impact the control strategy by modifying the amount of braking.

Speed sensor 20 may be one of a variety of speed sensors known to those skilled in the art. For example, a suitable speed sensor may include a sensor at every wheel that is averaged by controller 26. The controller may translate the wheel speeds into the speed of the vehicle. Yaw rate, steering angle, wheel speed and possibly a slip angle estimate at each wheel may be translated back to the speed of the vehicle at the center of gravity. Various other algorithms are known to those skilled in the art. Speed may also be obtained from a transmission sensor. For example, if speed is determined while speeding up or braking around a corner, the lowest or highest wheel speed may not be used because of its error. Also, a transmission sensor may be used to determine vehicle speed.

Load sensor 40 may be a load cell coupled to one or more suspension components. By measuring the stress, strain or weight on the load sensor a shifting of the load can be determined.

The roll condition of a vehicle can be characterized by the relative roll angle between the vehicle body and the wheel axle and the wheel departure angle (between the wheel axle and the average road surface). Both the relative roll angle and the wheel departure angle may be calculated in a relative roll angle estimation module by using the roll rate and lateral acceleration sensor signals or other sensor signals. If both the relative roll angle and the wheel departure angles are large enough, the vehicle may be in either single wheel lifting or double wheel lifting. On the other hand, if the magnitude of both angles is small enough, the wheels are likely all grounded. In the case that both of them are not small and the double wheel lifting condition is detected or determined, the sum of those two angles will be used by the feedback control module to compute the desired actuation command for achieving roll stability control performance.

The roll condition of a vehicle can be characterized by rolling radius-based wheel departure roll angle, which captures the angle between the wheel axle and the average road surface through the dynamic rolling radii of the left and right wheels when both of the wheels are grounded. Since the computation of the rolling radius is related to the wheel speed and the linear velocity of the wheel, such rolling-radius based wheel departure angles will assume abnormal values when there are large wheel slips. This happens when a wheel is lifted and there is torque applied to the wheel. Therefore, if this rolling radius-based wheel departure angle is increasing rapidly, the vehicle might have lifted wheels. Small magnitude of this angle indicates the wheels are all grounded.

The roll condition of the vehicle can be seen indirectly from the wheel longitudinal slip. If during a normal braking or driving torque the wheels at one side of the vehicle experience increased magnitude of slip, then the wheels of that side are losing longitudinal road torque. This implies that the wheels are either driven on a low mu surface or lifted up. The low mu surface condition and wheel-lifted-up condition can be further differentiated based on the chassis roll angle computation, i.e., in low mu surface the chassis roll angle is usually very small. Hence, an accurate determination of relative roll or chassis roll is desired.

The roll condition of the vehicle can be characterized by the normal loading sustained at each wheel. Theoretically, when a normal loading at a wheel decreases to zero, the wheel is no longer contacting the road surface. In this case a potential rollover is underway. Large magnitude of this loading indicates that the wheel is grounded. Normal loading is a function of the calculated chassis or relative roll and pitch angles. Hence, an accurate determination of chassis or relative roll and pitch angles is desired. U.S. Pat. No. 6,556,908 provides a method of computing those relative or chassis angles implemented in roll stability control systems.

The roll condition can be identified by checking the actual road torques applied to the wheels and the road torques, which are needed to sustain the wheels when they are grounded. The actual road torques can be obtained through torque balancing for each wheel using wheel acceleration, driving torque and braking torque. If the wheel is contacting the road surface, the calculated actual road torques must match or be larger than the torques determined from the nonlinear torques calculated from the normal loading and the longitudinal slip at each wheel.

The roll condition of a vehicle can be characterized by the chassis roll angle itself, i.e., the relative roll angle $\theta_{xr}$ between the vehicle body and the wheel axle. If this chassis roll angle is increasing rapidly, the vehicle might be on the edge of wheel lifting or rollover. Small magnitude of this angle indicates the wheels are not lifted or are all grounded. Hence, an accurate determination of the chassis roll angle is beneficial for determining if the vehicle is in a non-rollover event.

The roll condition of a vehicle can also be characterized by the roll angle between the wheel axle and the average road surface, this is called wheel departure angle. If the roll angle is increasing rapidly, the vehicle has lifted wheel or wheels and aggressive control action needs to be taken in order to prevent the vehicle from rolling over. The small magnitude of this angle indicates the wheels are not lifted.

The center of gravity C is also illustrated with nominal mass M. A roll axis is also illustrated at a distance D from the center of gravity. $a_y$ is the lateral acceleration.

Figure 3:
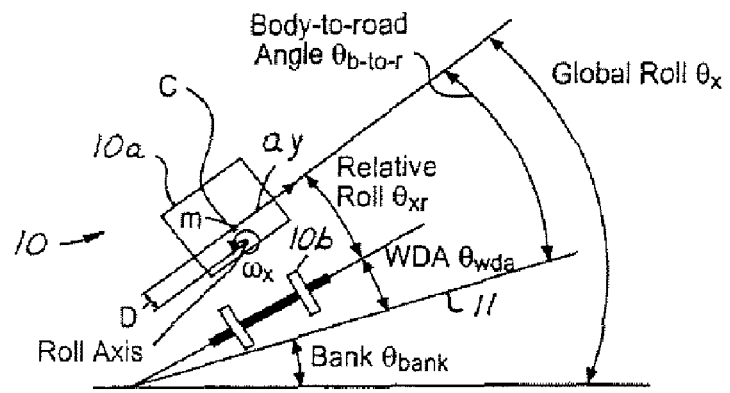
FIG. 3 is a front view of an automotive vehicle illustrating various angles according to the present invention.

Referring now to FIG. 3, the relationship of the various angles of the vehicle 10 relative to the road surface 11 is illustrated. In the following, a reference road bank angle $\theta_{bank}$ is shown relative to the vehicle 10 on a road surface. The vehicle has a vehicle body 10a and wheel axle 10b. The wheel departure angle $\theta_{wda}$ is the angle between the wheel axle and the road. The relative roll angle $\theta_{xr}$ is the angle between the wheel axle 10b and the body 10a. The global roll angle $\theta_x$ is the angle between the horizontal plane (e.g., at sea level) and the vehicle body 10a.

Another angle of importance is the linear bank angle. The linear bank angle is a bank angle that is calculated more frequently (perhaps in every loop) by subtracting the relative roll angle generated from the linear roll dynamics of a vehicle (see U.S. Pat. No. 6,556,908 which is incorporated by reference herein), from the calculated global roll angle (as the one in U.S. Pat. No. 6,631,317 which is incorporated by reference herein). If all things were slowly changing without drifts, errors or the like, the linear bank angle and reference road bank angle terms would be equivalent.

Figure 4:
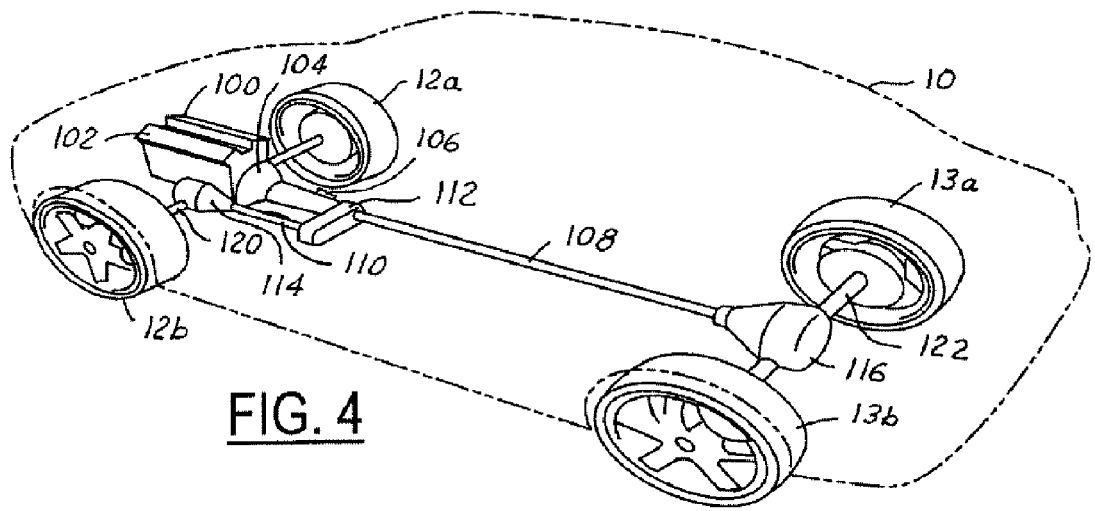
FIG. 4 is a perspective view of an automotive vehicle having active center differential (in a transfer case) according to the present invention.

Referring now to FIG. 4, vehicle 10 is illustrated in further detail. As illustrated in FIG. 1, vehicle 10 has wheels 12a, 12b, 13a and 13b. Vehicle 10 has an internal combustion engine 100. While an internal combustion engine is contemplated, the vehicle may also be powered by a diesel engine, electric engine, or could be powered by a hybrid engine utilizing one or more types of power systems. Engine 100 may have a throttle device 102 coupled thereto. The throttle device 102 is actuated by a foot pedal not shown. The throttle device 102 may be part of a drive-by-wire system or a direct mechanical linkage with the pedal. The throttle device 100 may generate an output signal that provides indication as to a low throttle opening or a large throttle opening. As those skilled in the art will recognize, throttle position sensors generate an output signal corresponding to the amount that the throttle is open. A similar result may be obtained by providing a sensor on the accelerator pedal if a direct linkage is used rather than a drive-by-wire system.

A transmission 104 may be coupled to the engine 100. Transmission 104 may be an automatic, continuously variable, or manual transmission. A gear selector (not shown) may be used to select the various gears of the transmission. A transmission controller 106 may be coupled thereto. The transmission controller 106 may be a separate component or integrated with an engine controller or another controller. The output of the transmission 106 is coupled to a rear driveshaft 108 and a front driveshaft 110 through a transfer case 112. The transfer case 112 may include a center differential. Transfer case 112 may include an active center differential. A front differential 114 and a rear differential 116 are used to couple the torque from the front driveshaft 110 and rear driveshaft 108, respectively, to the front axle 120 and rear axle 122, respectively. Both the front differential and rear differential may be referred to as an axle differential. The front differential 114 and rear differential 116 may be active axle differentials. By providing active axle differentials, a varying amount of torque to the wheels may be performed.

Both the front differential, rear differential and transfer case 112 may be electronically controlled in conjunction with various dynamic control systems, engine control systems, and transmission control systems as will be further described below.

It should also be noted that in the following description inside and outside wheels refer to the direction of the wheels in a turn. Thus, if the vehicle is turning left the wheels 12a and 13a are on the outside and the wheels 12b and 13b are on the inside of the turn.

Figure 5:
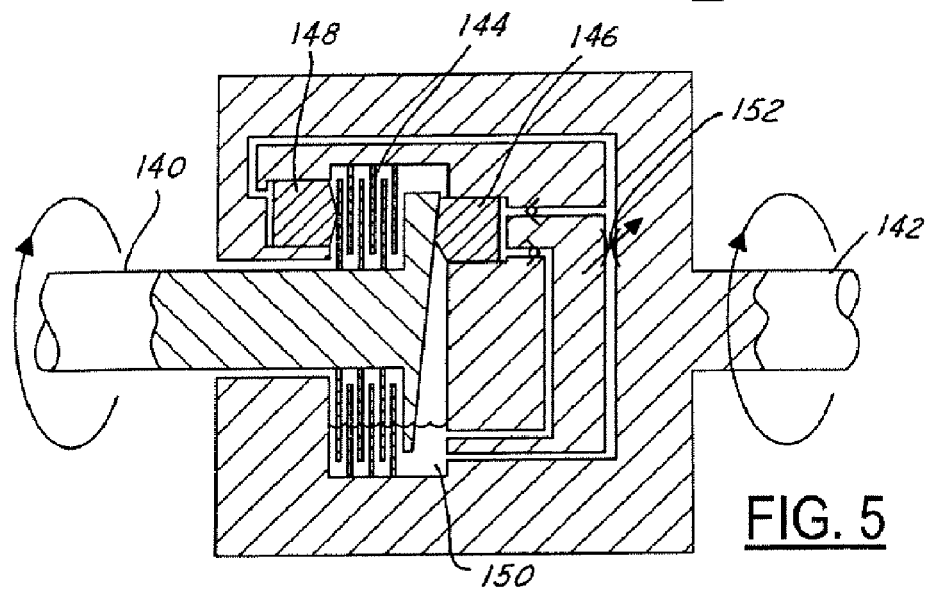
FIG. 5 is a schematic cross-sectional view of a transfer case with viscous coupling according to the present invention.

Referring now to FIG. 5, a Haldex transfer case, which has an active center differential, is shown in FIG. 5. The unique design of the Haldex comprises three functional parts: a hydraulic pump 146 driven by the slip between the axles/wheels; a wet multi-plate clutch 144; a controllable valve 152 with its electronic unit. The unit can be viewed as a hydraulic pump in which the housing and an annular piston are connected to one shaft and a piston actuator is connected to the other. The two shafts 140 (input shaft) and 142 (output shaft) are connected via the wet multi-plate clutch pack 144, which is normally unloaded and thus transfers no torque between the shafts. When both shafts are rotating at the same speed, there is no pumping action by the hydraulic piston pump 146. When a speed difference between the input shaft 140 and the output shaft 142 occurs, the pumping by the piston pump 146 starts immediately to generate oil flow. Because this is a piston pump there is virtually instantaneous reaction with no low-speed pumping loss. The oil from the piston pump 146 flows to a clutch piston 148, compressing the clutch pack 144 and braking the speed difference between the two shafts. The oil returns to a reservoir 150 via the controllable valve 152, which adjusts the oil pressure so as to adjust the magnitude of the amount of force applied on the clutch package. In traction/high slip conditions, a high pressure characteristics is delivered such that high torque is transferred between shafts 140 and 142. In tight curves (i.e. parking) or at high speeds, a much lower pressure characteristics is provided such that low torque is transferred between shafts 140 and 142.

Figure 6:
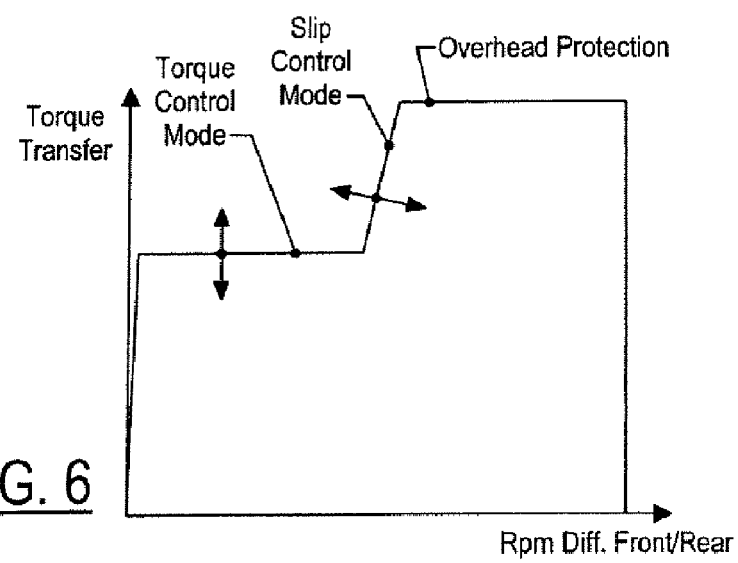
FIG. 6 is a plot of torque transfer versus rpm difference between the front and rear axles.

Referring now to FIGS. 5 and 6, the torque transferred and the rotational velocity difference between the input shaft 140 and the output shaft 142 is illustrated. The advantage of the Haldex transfer case includes: rapid activation and deactivation; on demand, the system can be deactivated in less than 60 ms; full integration with the brake control system; fully controllable torque transfer traction during acceleration; tolerating tire wear and the use of mini tire (internal detection of tire characteristics accordingly). The Haldex differential is activated whether the input shaft is rotating faster or slower than the output shaft. If the input shaft 140 is rotating slower than the output shaft 142, the input shaft is providing engine braking to the output shaft; if the input shaft is rotating faster than the output shaft, the engine is driving the output shaft. This is an advantage for the dynamic stability of the vehicle during acceleration or deceleration in combination with cornering maneuvering. The torque transfer characteristics are controlled by the engine control unit (ECU) through controlling the controllable valve 152. That is, the ECU using the vehicle driving/braking management information to control the opening of the controllable valve 152 such that the oil pressure can be adjusted such that the torque transfer between the input shaft and the output shaft can be adjusted. With the controllable torque transfer characteristics of the Haldex, the vehicle performance does not need to be compromised among demanding high torque transfer, maneuverability and low torque transfer. The torque transfer is optimized for each driving situation to increase maximum safety and performance. In normal driving conditions, the torque is controlled by the ECU. When a wheel starts to spin, the clutch pack 144 automatically and instantly stops the spinning by reducing the rotational speed difference between the input and output shafts. The maximum or full torque is also controlled by a separated overprotection valve.

Figure 7:
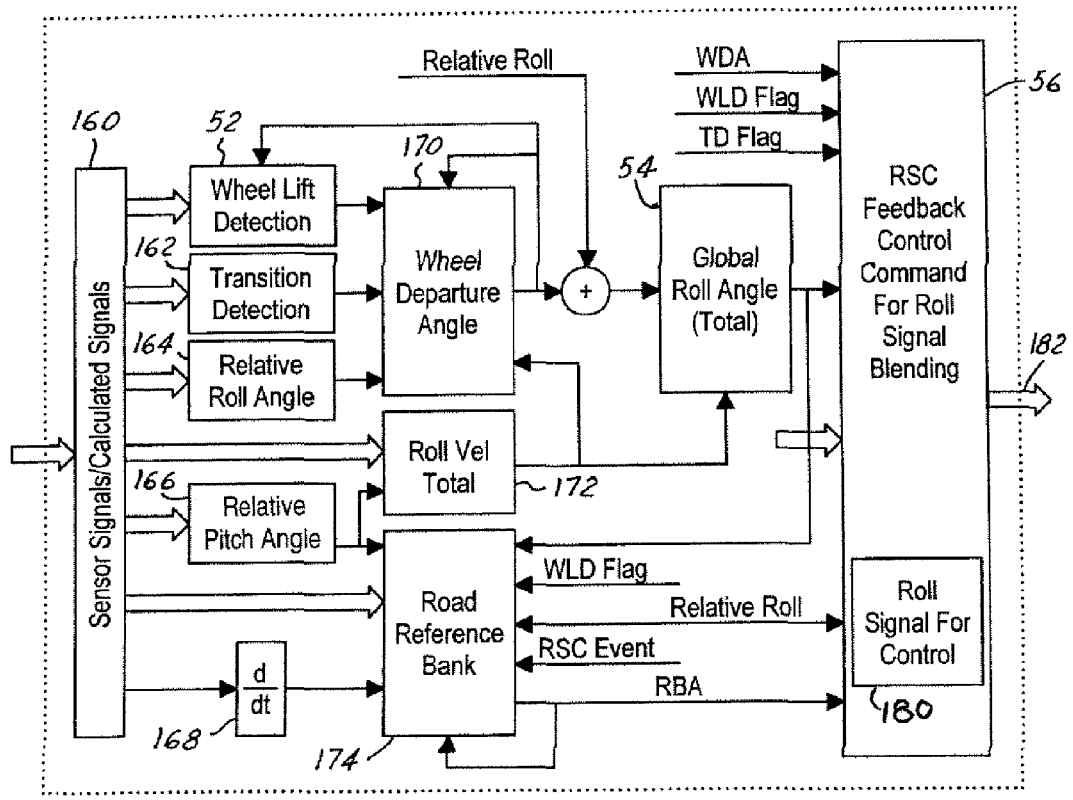
FIG. 7 is a detailed plot of a roll stability controller according to the present invention.

Referring now to FIG. 7, the controller 26 is illustrated in further detail. The controller 26 receives the various sensor signals, 20, 28, 32, 34, 35, 36, 37 at a multiplexer 160 and integrates all the sensor signals with the calculated signals to generate signals suitable for roll stability control algorithms. From the various sensor signals wheel lift detection may be determined by the wheel lift detector 52. Wheel lift detector 52 includes both active wheel lift detection and passive wheel lift detection, and wheel grounding condition detection. Wheel lift detector is described in co-pending U.S. provisional application Ser. No. 60/400,375 filed Aug. 1, 2002, and U.S. patent application Ser. No. 10/608,909, which are incorporated by reference herein. The modules described below may be implemented in hardware or software in a general purpose computer (microprocessor). From the wheel lift detection module 52, a determination of whether each wheel is absolutely grounded, possibly grounded, possibly lifted, or absolutely lifted may be determined. Transition detection module 162 is used to detect whether the vehicle is experiencing aggressive maneuver due to sudden steering wheel inputs from the driver. The sensors may also be used to determine a relative roll angle in relative roll angle module 164. Relative roll angle may be determined in many ways. One way is to use a roll acceleration module 168 in conjunction with the lateral acceleration sensor. As described above, the relative roll angle may be determined from the roll conditions described above.

The various sensor signals may also be used to determine a relative pitch angle in relative pitch angle module 166 and a roll acceleration in roll acceleration module 168. The outputs of the wheel lift detection module 52, the transition detection module 162, and the relative roll angle module 164 are used to determine a wheel departure angle in wheel departure angle module 170. Various sensor signals and the relative pitch angle in relative pitch angle module 166 are used to determine a relative velocity total in module 172. A road reference bank angle block 174 determines the bank angle. The relative pitch angle, the roll acceleration, and various other sensor signals as described below are used to determine the road reference bank angle. Other inputs may include a roll stability control event (RSC) and/or the presence of a recent yaw stability control event, and the wheel lifting and/or grounding flags.

The global roll angle of the vehicle is determined in global roll angle module 54. The relative roll angle, the wheel departure angle, and the roll velocity total blocks are all inputs to the global roll angle total module 54. The global roll angle total block determines the global roll angle $\theta_x$. An RSC feedback control module 56 receives the global roll angle total module 54 and the road reference bank angle from the road reference bank angle module 174. A roll signal for control is developed in roll signal module 180. The roll signal for control is illustrated as arrow 182.

In the reference road bank angle module 174, the reference bank angle estimate is calculated. The objective of the reference bank estimate is to track a robust but rough indication of the road bank angle experienced during driving in both stable and highly dynamic situations, and which is in favor for roll stability control. That is, this reference bank angle is adjusted based on the vehicle driving condition and the vehicle roll condition. Most importantly, when compared to the global roll estimate, it is intended to capture the occurrence and physical magnitude of a divergent roll condition (two wheel lift) should it occur. This signal is intended to be used as a comparator against the global roll estimate for calculating the error signal, which is fed back to roll stability controller 26.

Figure 8:
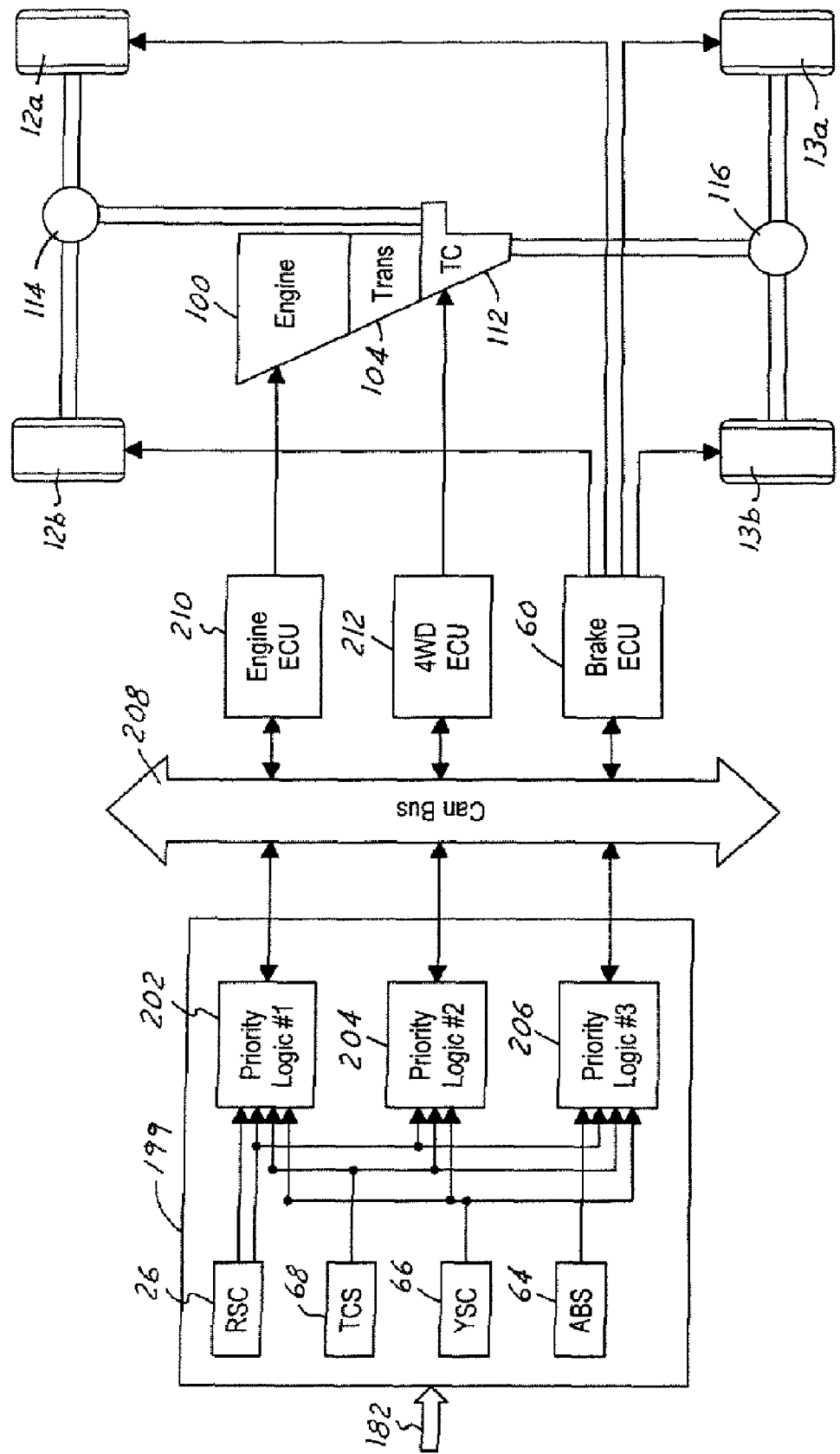
FIG. 8 is a block diagrammatic view of a roll stability control system with a four-wheel driven vehicle.

Referring now to FIG. 8, a high level block diagrammatic illustration of a roll stability control system according to the present invention is illustrated. The sensor signals and the calculated signals from the sensor signals (such as the roll signal for control 182) are fed into the integrated control unit 199. The calculated signals may be provided to the various dynamic control algorithm units in which feedback and/or feedforward control signals or control commands are calculated based on the available signals to achieve various control functions. Those control algorithm units include the roll stability controller 26, the traction control system 68, the yaw stability control system 66, and the anti-lock brake system 64.

The outputs of the various control algorithm units generate the control commands for achieving specific control functions and those control commands are ready to activate the specific actuator hardware. Due to potential conflicting of interests, the individual control command might command the specific actuator in a different manner. For example, the roll stability control might request the front outside brake to increase its pressure level while the ABS control might request same actuator to either hold or damp its brake pressure. Therefore, it is necessary to arbitrate or prioritize the multiple control requests sending to the same actuator. Such arbitration or priority logics are conducted in a first priority logic 202, a second priority logic 204, and a third priority logic 206. Priority logic 202, 204 and 206 generate the final or arbitrated or prioritized control commands for engine ECU 210, 4WD ECU 212 and brake ECU 60, respectively. For example, TCS, RSC and YSC might request engine torque reduction simultaneously, the maximum rule might be used in priority logic 202 to calculate torque reduction sending to engine ECU. Another example, TCS, ABS, RSC and YSC might all request brake pressure at one brake, in this case, the maximum rule might be used in priority logic 206. However, some of the functions might request pressure drop (for example, ABS), some of the functions might request pressure increase at the same brake location. In this case, a more sophisticated brake pressure priority or arbitration logic is conducted in priority logic 206. The priority logics may be provided to a vehicle area network (CAN) bus 208.

Notice that the above priority logic group only touches the cases where multiple control commands are requesting actuations for the same actuator. Another priority logic group is conducted where a specific control command for a specific control function is sent to multiple actuators. For example, the RSC feedback control command is sent to engine ECU 210 for engine torque reduction, to 4WD ECU 212 for front and rear torque distribution, to Brake ECU for brake torque in the front outside wheel and to suspension for roll stiffness distribution, etc. In those cases, more sophisticated coordination are conducted based on vehicle motion variables.

Figure 9:
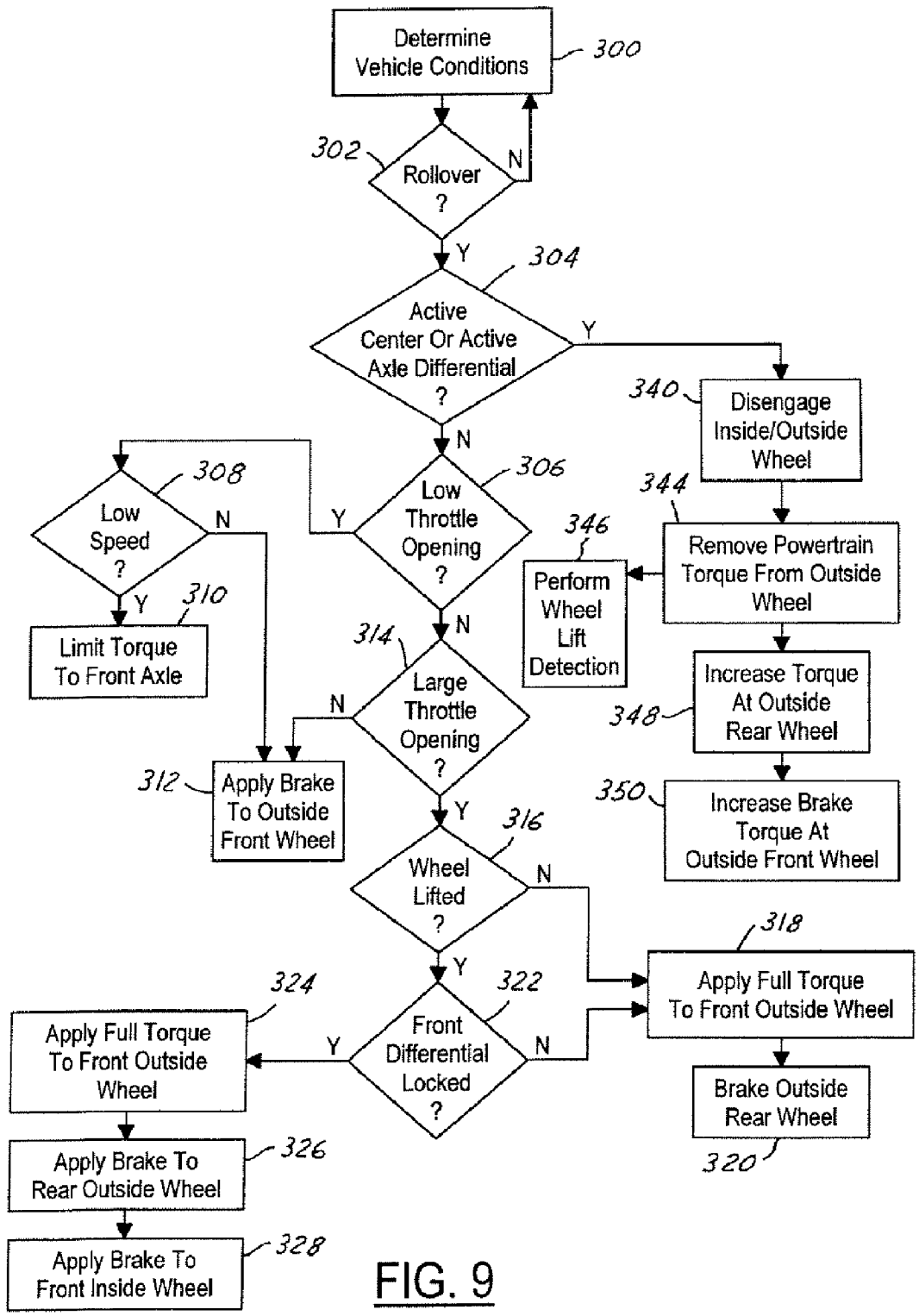
FIG. 9 is a flow chart illustrating one preferred method for operating the present invention.

Referring now to FIG. 9, a flow chart for conducting roll stability control or controlling rollover in a vehicle equipped with a brake-based roll stability control system and a 4×4 system is described. Such a flow chart shows the actions when only roll stability control function is requested, i.e., the priority logic is conducted for sending RSC control command to multiple actuators. When the other control functions are presented, further prioritizing and arbitrating are required.

In step 300, the various vehicle conditions are determined. The various vehicle conditions include the dynamic conditions and the derivations from the dynamic conditions sensors. Such conditions include a potential rollover condition including both wheel lifting (qualitative rollover condition) and large body-to-road roll angle (quantitative rollover condition). In step 302, such a potential rollover condition of the vehicle is determined. If there is not a potential rollover, step 300 is repeated. In step 302, if a potential rollover has been detected by the vehicle controller, step 304 is executed. In step 304, whether or not the vehicle has an active differential such as an active center or active axle differential is determined. This step may be in form only since it will likely be known from the vehicle configuration whether or not the vehicle is equipped with an active differential. If the vehicle does not have an active center or active axle differential, step 306 is executed. In step 306, the amount of throttle opening is determined. If the amount of throttle opening is low, that is, below a low throttle threshold, step 308 is executed. In step 308 it is determined whether or not the vehicle speed is below a low speed threshold. Since the on-road rollover event cannot happen in straight road driving, such low speed check is only meaningful during cornering for roll stability control performance. If the vehicle speed is below a low speed threshold in step 308, step 310 is executed in which the torque to the front axle is automatically limited due to engine braking during cornering. In both straight driving and cornering, no actual control action is needed. That is, a differential limiting torque is generated at the front axle which in turn generates a braking force at the front axle. Hence, in this case, the vehicle achieves RSC functionality automatically with a need to control the driving torque and the braking torque. The engine braking phenomenon is due to the speed difference between the front and rear wheels during low speed cornering.

Referring back to step 308, if the vehicle is not in low speed, then braking is applied to the outside front wheel as in a conventional roll stability control system.

Referring back to step 306, if the throttle does not have a low opening, step 314 is executed. In step 314, it is determined whether or not the vehicle has a large throttle opening. If the vehicle does not have a large throttle opening, step 312 is executed in which the brake is applied to the outside front wheel as in conventional roll stability control systems. In step 314, if a large throttle opening is determined by comparing the throttle signal to a threshold, and the throttle signal indicates a signal greater than the threshold, step 316 is executed. In step 316, it is determined whether or not a wheel has lifted. The wheel lift detection is described in block 52 above. If the vehicle has no wheels lifted, step 318 is executed in which full torque to the outside front wheel is applied. In step 320, the outside rear wheel is braked simultaneously with the application of torque to the front outside wheel. In such an activation arrangement, the oversteer yawing is eliminated or reduced due to the yawing torque balancing between the driven wheel and the braking wheel. Referring back to step 316, if a single wheel lift or double wheel lift has been detected, step 322 is executed. In step 322 it is determined whether or not the front differential has been locked. If the front differential has been locked, step 324 is executed in which full torque to the front outside wheel is applied, the brake is applied to the outside rear wheel in step 326, and brakes may be applied then to the front inside wheel in step 328. Steps 324, 326 and 328 are preferably all executed with a limited slip differential or a Torsen differential. If the front differential has not been locked in step 322, then step 318 is executed.

Referring back to step 304, if there is an active center or active axle differential, a different control scheme may be implemented. With an active differential, the amount of torque to any wheel or wheels may be controlled. For example, in step 340 the inside wheels may be disengaged from the outside wheel. In step 344, powertrain torque may be removed from the outside front wheel. This may allow the wheel lift detection system to perform active wheel lift detection in step 346. In step 348, the torque may be increased at the outside rear wheel to make the roll stability control system less intrusive. In step 350, brake torque may be increased at the outside front wheel. That is, all powertrain torque may be removed from the outside front wheel and brake torque applied thereto. Power from the powertrain may then be applied to the outside rear wheel to counter the deceleration caused by braking the front wheel. The reduction in deceleration will make the roll stability control system less intrusive to the driver and passenger. Also, the lateral forces on the outside rear tire may also be reduced. Torque transfer between the front and rear tires may also be used to balance the vehicle weight transfer from front to rear. Also, positive torque to the outside front wheel may be performed to increase understeer.

Active axle differentials may also help the traction control system strategy during a rollover event by reducing the torque on a wheel that is slipping (positive slip ratio) and applying the torque to another wheel. In this way large vehicle sideslip caused by the spinning wheels in the rear axle might be prevented. It should be noted that when there is wheel lifting, the demand torque for the front or rear axle is based upon the roll signal for control as described above. Other variables also factor into the amount of control provided by the system.

Figures 10, 11:
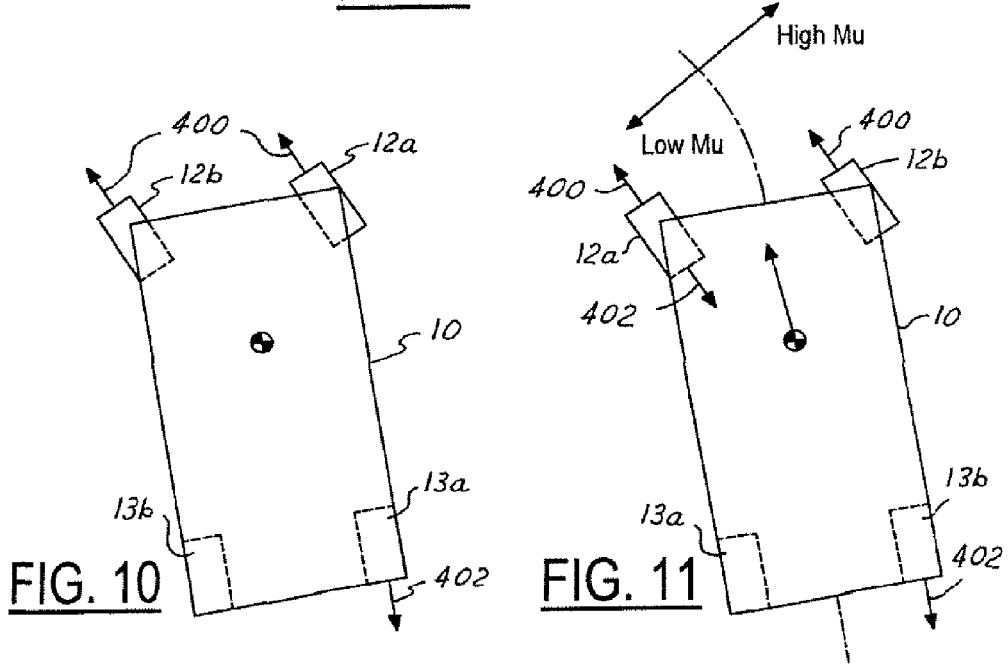
FIG. 10 is a diagrammatic view of a vehicle having forced braking and center differential torque acting thereon.
FIG. 11 is a top view of a vehicle on a split mu surface having an active center differential.

Referring now to FIG. 10, a vehicle 10 is illustrated having driving forces 400 applied to the wheels. A braking force 402 is applied to the outside rear wheel which in this case is 13*a*. In this case the differential is locked and the outside rear wheel is braked. One hundred percent driving torque is therefore transferred to the front wheels.

Referring now to FIG. 11, the vehicle 10 is in a split mu driving condition. That is, to the left of the vehicle is a low mu condition whereas, to the right of the vehicle a high mu condition is set forth. Driving forces are represented by arrows 400 whereas the braking force is provided on the front left wheel 12*a* as braking force 402. FIG. 11 presumes a limited slip or Torsen differential. This case is represented by steps 324 through 328 in FIG. 9.

While particular embodiments of the invention have been shown and described, numerous variations and alternate embodiments will occur to those skilled in the art. Accordingly, it is intended that the invention be limited only in terms of the appended claims.

What is claimed is:

1. A method of controlling a vehicle with a 4×4 driving system, said method comprising the steps of:
   determining a potential rollover condition from dynamic conditions sensed onboard said vehicle; and
   transferring driving torque both through an electronically-controlled center differential or an electronically-controlled transfer case and to the front wheels of said vehicle so as to prevent rollover of said vehicle.

2. A method as recited in claim 1, wherein the step of transferring said driving torque is performed when the speed of said vehicle is determined to be below a predetermined low speed threshold.

3. A method as recited in claim 1, wherein the step of transferring said driving torque is performed when a steering wheel angle of said vehicle is determined to be above a predetermined steering-wheel angle threshold.

4. A method as recited in claim 1, wherein the step of transferring said driving torque is performed when a throttle opening is determined to be below a predetermined throttle-opening threshold.

5. A method as recited in claim 1, wherein the step of transferring said driving torque is performed when both the speed of said vehicle is determined to be below a predetermined low-speed threshold and a throttle opening is determined to be below a predetermined throttle-opening threshold.

6. A method as recited in claim 1, wherein the step of determining said potential rollover condition is performed in response to a roll-rate signal.

7. A method of controlling a vehicle with a 4×4 driving system, said method comprising the steps of:
   generating a rollover signal in response to a potential rollover situation as determined from dynamic conditions sensed onboard said vehicle:
   increasing a torque in front outside wheel of said vehicle through a differential in response to said rollover signal; and
   braking a rear outside wheel of said vehicle in response to said rollover signal.

8. A method as recited in claim 7, wherein the step of increasing said torque is performed when a throttle opening is determined to be above a predetermined throttle-opening threshold.

9. A method as recited in claim 7, wherein the step of increasing said torque is accomplished by increasing said torque to a full torque application level.

10. A method as recited in claim 7, wherein said method further comprises the step of reducing oversteer yawing in response to said increasing said torque in said front outside wheel and also said braking said rear outside wheel.

11. A method as recited in claim 7, wherein said method further comprises the step of braking a front inside wheel of said vehicle.

12. A method as recited in claim 11, wherein the steps of increasing said torque in said front outside wheel and braking both said rear outside wheel and said front inside wheel are performed when a throttle opening is determined to be above a predetermined throttle-opening threshold.

13. A method as recited in claim 7, wherein said method further comprises the steps of determining a wheel lift condition and braking a front inside wheel of said vehicle during the determination of said wheel lift condition.

14. A method as recited in claim 7, wherein the step of increasing said torque is performed using a limited-slip differential or a viscous coupling.

15. A method as recited in claim 7, wherein the step of increasing said torque is performed using a Torsen differential.

16. A method of controlling a vehicle having an active differential, said method comprising the steps of:
   determining a rollover condition from dynamic conditions sensed onboard said vehicle;
   in response to said rollover condition, controllingly disengaging an inside wheel of said vehicle from an outside wheel of said vehicle with said active differential; and
   thereafter, determining a wheel lift condition of said inside wheel.

17. A method as recited in claim 16, wherein said method further comprises the step of applying engine torque to said outside wheel so as to prevent rollover of said vehicle.

18. A method as recited in claim 16, wherein the step of determining said wheel lift condition is accomplished by actively determining wheel lift.

19. A method as recited in claim 18, wherein actively determining said wheel lift is accomplished by applying a change in torque to said inside wheel and also monitoring a change in speed of said wheel.

20. A method of controlling a vehicle having a first wheel, a second wheel, and an active differential, said method comprising the steps of:
   during a potential rollover event or stability control event, determining a slip condition of said first wheel of said vehicle;
   controllingly reducing torque to said first wheel in response to said slip condition using said active differential; and
   controllingly increasing torque to said second wheel in response to said slip condition using said active differential.

21. A method as recited in claim 20, wherein said active differential is an active center differential.

22. A method as recited in claim 20, wherein said active differential is an active axle differential.

23. A method as recited in claim 20, wherein determining said slip condition is accomplished in a traction control system (TCS).

24. A method of controlling a vehicle having an active differential, said method comprising the steps of:
   determining a rollover condition from dynamic conditions sensed onboard said vehicle;
   in response to said rollover condition, controllingly disengaging a front outside wheel from an inside wheel of said vehicle with said active differential;
   applying a braking torque to said front outside wheel; and
   applying a powertrain torque to a rear outside wheel of said vehicle so as to counter a deceleration caused by the braking of said front outside wheel.

25. A method as recited in claim 24, wherein the step of applying powertrain torque to said rear outside wheel is accomplished so as to balance a weight transfer from front to rear of said vehicle.

26. A method of controlling a vehicle having an active differential, said method comprising the steps of:
   determining a possible rollover condition from dynamic conditions sensed onboard said vehicle; and
   in response to said possible rollover condition, using said active differential to distribute torque between a front wheel, a front left wheel, a rear left wheel, and a rear right wheel of said vehicle so as to help prevent actual rollover.

27. A method as recited in claim 26, wherein distributing torque is at least partially accomplished by applying positive torque to a front outside wheel of said vehicle.

28. A method as recited in claim 26, wherein distributing torque is at least partially accomplished by applying positive torque to a front outside wheel of said vehicle so as to reduce understeer.

29. A roll stability control system for a vehicle having front wheels and rear wheels, said roll stability control system comprising:
 a differential;
 a rollover sensor operable to generate a rollover signal; and
 a controller coupled to said rollover sensor and said differential;
 wherein said controller is operable to control said differential so as to limit vehicle powertrain torque applied to said front wheels and thereby prevent rollover of said vehicle.

30. A roll stability control system for a vehicle as recited in claim 29, wherein said differential is an active differential.

31. A roll stability control system for a vehicle as recited in claim 29, wherein said differential is an active axle differential.

32. A roll stability control system for a vehicle as recited in claim 29, wherein said rollover sensor comprises a roll-rate sensor.

33. A roll stability control system for a vehicle as recited in claim 29, wherein said rollover sensor comprises a roll-rate sensor and a lateral-acceleration sensor.

34. A roll stability control system for a vehicle as recited in claim 29, wherein said rollover sensor comprises a roll-rate sensor, a lateral-acceleration sensor, and a vehicle-speed sensor.

35. A roll stability control system for a vehicle as recited in claim 29, wherein said rollover sensor comprises a roll-rate sensor, a lateral-acceleration sensor, a vehicle-speed sensor, and a yaw-rate sensor.

\* \* \* \* \*